United States Patent [19]

Brown et al.

[11] Patent Number: 5,518,633

[45] Date of Patent: May 21, 1996

[54] PROCESS FOR TREATING AQUEOUS MEDIA CONTAINING METAL IONS

[75] Inventors: Cary V. Brown, Waverly, Tenn.; John S. Craven, Wilmington, Del.; Gregory A. Martz; James E. Merkle, Jr., both of Dickson, Tenn.; William L. Vick, Camden, Tenn.; Melissa C. Wagner, Newark, Del.

[73] Assignee: E. I. Du Pont de Nemours and Company, Wilmington, Del.

[21] Appl. No.: 327,332

[22] Filed: Oct. 21, 1994

[51] Int. Cl.$^6$ .................................................. C02F 1/62
[52] U.S. Cl. .................... 210/713; 210/718; 210/724; 210/726; 210/912; 423/DIG. 1
[58] Field of Search .................................. 210/712, 713, 210/718, 723, 724, 725, 726, 727, 912; 423/DIG. 1

[56] References Cited

U.S. PATENT DOCUMENTS

| | | | |
|---|---|---|---|
| 3,575,853 | 4/1971 | Gaughan et al. | |
| 3,738,932 | 6/1973 | Kostenbader | |
| 4,465,597 | 8/1984 | Herman et al. | 210/713 |
| 4,503,017 | 3/1985 | Gadd et al. | 210/724 |
| 4,724,084 | 2/1988 | Pahmeier et al. | 210/712 |
| 5,039,428 | 8/1991 | Wentzler et al. | 210/711 |
| 5,128,047 | 7/1992 | Stewart et al. | 210/724 |
| 5,266,210 | 11/1993 | McLaughlin | 210/725 |
| 5,282,977 | 2/1994 | Schinkitz | 210/724 |
| 5,407,650 | 4/1995 | Hartmann et al. | 210/724 |

FOREIGN PATENT DOCUMENTS

| | | | |
|---|---|---|---|
| 49-11810 | 3/1974 | Japan | 210/726 |
| 53-113795 | 10/1978 | Japan | 210/724 |
| 58-89988 | 5/1983 | Japan | 210/724 |
| 709561 | 1/1980 | U.S.S.R. | 210/726 |
| 710979 | 1/1980 | U.S.S.R. | 210/912 |
| 850606 | 8/1981 | U.S.S.R. | 210/724 |

Primary Examiner—Peter A. Hruskoci
Assistant Examiner—Theodore M. Green

[57] ABSTRACT

Process for treating aqueous media containing metal ions having valences of +2 and higher and optionally acid comprising:

(a) contacting the aqueous media, at a pH of about 1–5, with an effective amount of product recycled from step (b) to dissolve at least some metal carbonates, produce at least some $CO_2$, convert at least some metal ions having a valence of at least +3 to metal hydroxide precipitates, and neutralize some acid, if present;

(b) contacting the product of step (a), at a pH of about 4–8.5, with an effective amount of $Na_2CO_3$ to convert at least some metal ions of +2 valence to metal carbonate precipitates and form at least some dissolved sodium salts;

(c) recovering, from a portion of the product from step (b) that is not recycled, metal carbonates, metal hydroxides, and sodium salts.

11 Claims, 2 Drawing Sheets

PROCESS FOR TREATING AQUEOUS MEDIA CONTAINING METAL IONS

BACKGROUND OF THE INVENTION

Aqueous media containing metal ions arises from many processes. For example, such aqueous media can arise as a byproduct from producing titanium dioxide by the chloride or sulfate process; cleaning or etching steel, iron or other metals with acids; leaching various ores with mineral acid; and treating or plating metals.

Large quantities of such aqueous media exist. Often, to dispose of them, they are deep-welled or neutralized with a basic material such as calcium oxide, sodium carbonate, calcium hydroxide, dolamite, sodium hydroxide or potassium hydroxide. Traditionally, the resulting solids have been landfilled and the resulting brine has been deep-welled or discharged to surface waters. These methods, however, are becoming less viable because environmental requirements are becoming more stringent.

The need therefore exists for a process for treating aqueous media containing metal ions that would produce saleable products and thus would reduce use of landfills and other disposal methods.

The following brief summary is provided of certain references that may be pertinent to this invention.

Wentzler, U.S. Pat. No. 5,039,428, discloses a process for removing dissolved metals from waste water by treating with sodium hydroxide or calcium hydroxide to form precipitates, and recycling a portion of the precipitates.

Kostenbader, U.S. Pat. No. 3,738,932, discloses a process for treating acid water containing metallic values with an alkali-water slurry and recycled sludge mix to neutralize the acidity and precipitate the metallic values as solids.

Gaughan, U.S. Pat. No. 3,575,853, discloses a process for treating waste water comprising reducing the metal ions therein to their lowest valence state, treating with an alkali media to form precipitates, and recycling a portion thereof after settling.

Herman, U.S. Pat. No. 4,465,597, discloses a process for remediating acidic waste water containing dissolved heavy metals and having a pH of about 2.5–5 by treating with a carrier agent and neutralizing agent.

SUMMARY OF THE INVENTION

In accordance with this invention there is provided a process for treating aqueous media containing metal ions having valences of +2 and higher and optionally acid comprising:

(a) contacting the aqueous media, at a pH of about 1–5, with an effective amount of the product recycled from step (b) to dissolve at least some metal carbonates, produce at least some $CO_2$, convert at least some metal ions having a valence of at least +3 to metal hydroxide precipitates, and neutralize some acid, if present;

(b) contacting the product of step (a), at a pH of about 4–8.5, with an effective amount of $Na_2CO_3$ to convert at least some metal ions of +2 valence to metal carbonate precipitates and form at least some dissolved sodium salts;

(c) recovering, from a portion of the product from step (b) that is not recycled, metal carbonates, metal hydroxides, and sodium salts.

It has been found that the process of this invention can produce saleable products, including, but not limited to, carbon dioxide, sodium chloride, metal hydroxides, and metal carbonates. The sodium chloride can be used for many traditional uses for this material such as water conditioning, melting ice or snow, and as a feedstock for the production of sodium, sodium hydroxide, sodium hypochlorite, and chlorine. The metal hydroxides and metal carbonates can be used as a colorant or filler, especially for brick manufacture. Other advantages of the process of this invention are:

- The metal carbonate and metal hydroxide precipitates can be readily dewatered;
- Use of dry sodium carbonate can provide for more controlled growth of the precipitate particles;
- There can be improved utilization of the neutralization capacity of the sodium carbonate.
- Recycle of precipitates from step (c)(iii) can improve settling of precipitates.
- There generally is no need to reduce the valence state of the metal ions in the aqueous media before treating.
- The salt associated with the metal carbonates and metal hydroxides can be easily removed.
- The settling rate of precipitates formed in step (c) can be enhanced by the addition of calcium ion.
- Addition of calcium ion to step (c) can reduce residual carbonate ion concentration, thereby reducing the need for carbonate purge during sodium chloride crystallization in step (c).
- The process can efficiently and economically remove high concentrations of metal ions in the aqueous media.

DETAILED DESCRIPTION OF THE INVENTION

Aqueous Media Containing Metal Ions

Figure 1:
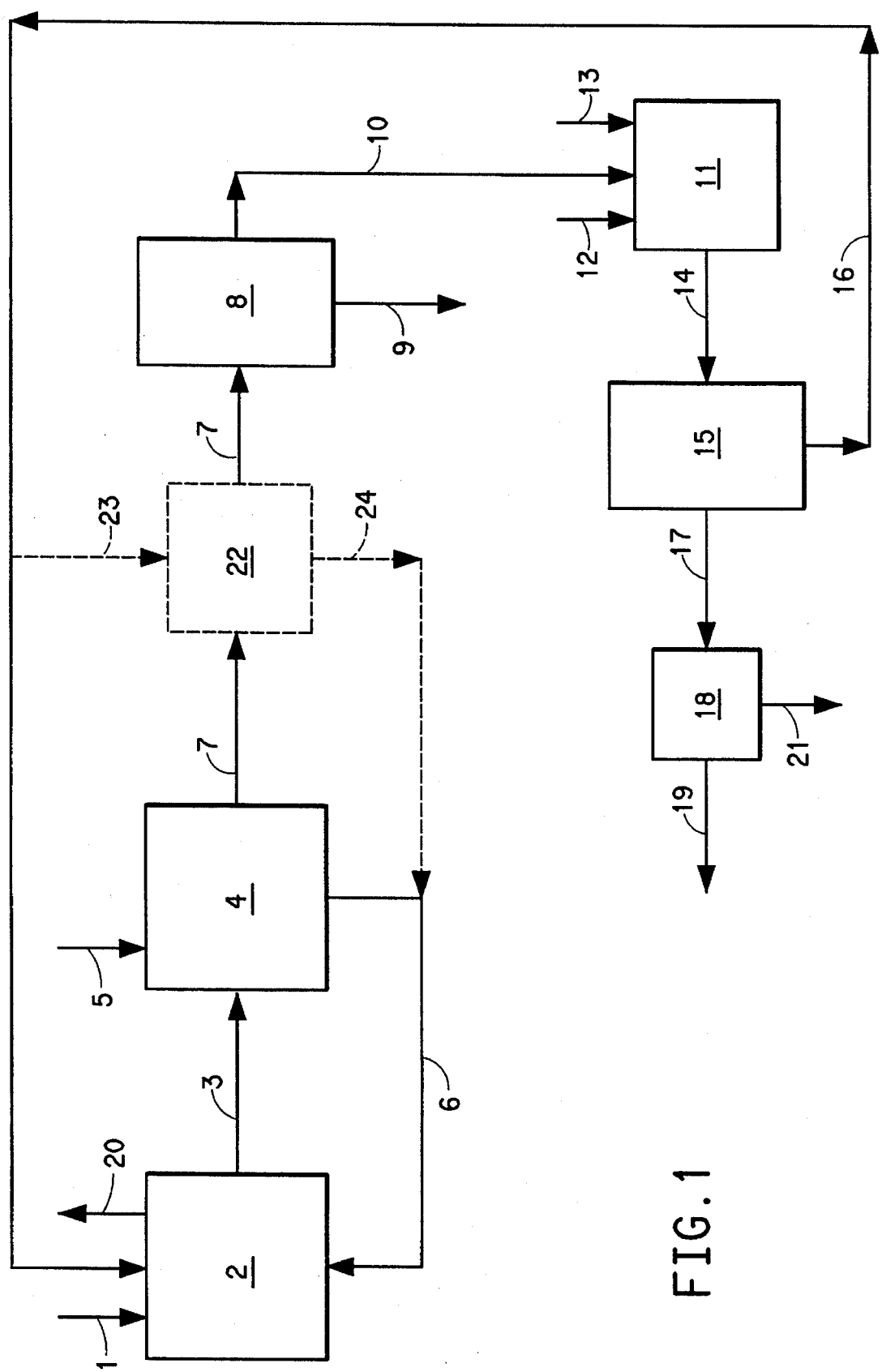
FIG. 1 sets forth an embodiment of this invention.

Aqueous media containing metal ions suitable for treating in accordance with the process of this invention include, but are not limited to, byproducts from producing titanium dioxide by the chloride or sulfate process; cleaning or etching iron, steel, or other metals with acids such as HCl; leaching various ores with acids; and treating or plating metals.

If the aqueous media arises as a byproduct from the production of $TiO_2$ by the chloride process, it typically will contain metal chlorides (such as chlorides of iron, manganese, magnesium, titanium, vanadium, zirconium, and calcium), HCl or mixtures thereof. The process of this invention is especially suited for treating such $TiO_2$ byproduct materials.

The aqueous media can also contain various acids such as hydrochloric, sulfuric, nitric, phosphoric or mixtures thereof.

Preferably, the aqueous media will be acidic, and most preferably, have a pH of about 5 or less. If the aqueous media does not have such pH, it can be treated with suitable amounts of acid. A preferred source of acid is spent acid arising from various industrial processes. Using such spent acid would be desirable because it would both (a) condition the aqueous media for use in the process of this invention, and (b) provide for an environmentally attractive means for disposing of the acid.

Step (a):

Step (a) of the process of this invention comprises contacting the aqueous media, at a pH of about 1–5, with an effective amount of the product recycled from step (b) to dissolve at least some metal carbonates, produce at least some $CO_2$, 20, convert at least some metal ions having a valence of at least +3 to metal hydroxide precipitates, and neutralize some acid, if present.

The primary reactions believed to take place in step (a) are as follows:

- Dissolving metal carbonate:

$MeCO_3 \text{(solid)} \longrightarrow Me^{+2} + CO_3^{-2}$

- Neutralizing acid and $CO_2$ production $H_2O \longleftrightarrow H^+ + OH^-$ $CO_3^{-2} + H^+ \longleftrightarrow HCO_3^-$ $HCO_3^- + H^+ \longrightarrow H_2O + CO_2$

- Precipitating +3 and higher valent metals:

$MeO^{+x} + X\ OH^- \longrightarrow MeO(OH)_x \text{(solid)}$ $Me^{+y} + Y\ OH^- \longrightarrow Me(OH)_y \text{(solid)}$ wherein x =1 or greater
    wherein y =3 or greater In regard to the metal carbonates dissolved in step (a), they often will remain in solution until precipitated in step (b). Adjustment of the pH, preferably by varying the amount of recycle from step (b), can enhance the desired solubility of the higher valent metals.

The pH in step (a) preferably will be about 1–5, more preferably about 2–5, and most preferably about 3–4.

Typically, the amount of product from step (b) that is recycled will be sufficient to permit the desired reactions and precipitations to take place in the desired time while maintaining the desired pH. If desired, the concentration of the precipitates in the step (b) product can be increased before recycle, such as by settling, centrifuging, decanting, etc. However, this often is not necessary.

The residence time in step (a) should be sufficient to permit the desired reactions, precipitations, and particle growth to take place. Typically, the residence time will be about 1 minute to 12 hours; preferably about 10 minutes to 2 hours; and most preferably about 20 minutes to 1 hour. Often, if the conditions are optimum, the residence time can be less than an hour.

It is desirable during step (a) to provide agitation to the aqueous media. Typically, the agitation will be sufficient to enhance the rate of reaction by increasing the rate of contact of the reactants, but will not be so violent that it causes precipitate particles to be broken-up. The agitation can be provided, for example, by paddles, stirring mechanisms, pumps, vibration, ultrasound or combinations thereof. Preferred is a continuously stirred tank reactor.

Typically, the reaction in step (a) and the other steps of the process of this invention will be carried out at about 15–98 degrees C., preferably about 25–90 degrees C., and most preferably about 30–80 degrees C.

It also can be desirable to employ means to enhance the removal of $CO_2$ evolved during step (a), as this can enhance the rate of certain of the reactions. Suitable means include, but are not limited to, venting the reaction vessel, adjusting the agitation conditions so that the surface of the aqueous media exposed to air is changed, sparging gas into the aqueous media, and combinations thereof.

Step (b):

Step (b) of the process of this invention comprises contacting the product of step (a), at a pH of about 4–8.5, with an effective amount of $Na_2CO_3$ to convert at least some metal ions of +2 valence to metal carbonate precipitates and form at least some dissolved sodium salts.

The primary reactions believed to take place in step (b) are as follows:

Precipitating metal carbonates: $Me^{+2} + Na_2CO_3 \rightarrow MeCO_3 \text{(solid)} + 2\ Na^+$ Hydrolyzing $CO_3^{-2}$: $CO_3^{-2} + H_2O \rightarrow HCO3^- + OH^-$ For the reaction shown above of metal salt with sodium carbonate, an example is the reaction of ferrous chloride with sodium carbonate to form ferrous carbonate precipitate and sodium chloride. Note that the sodium chloride typically would remain dissolved until isolated and crystallized in step (c).

The amount of sodium carbonate used can vary depending on the nature of the aqueous media and the amount of precipitates desired. Ordinarily, a series of test reactions can determine the optimum amount of sodium carbonate. Often, about a stoichiometric amount of sodium carbonate will be used, although a stoichiometric deficiency or excess may be used, depending on the aqueous media and the desired results. Typically, sodium carbonate in the amount of about 80–120 percent and preferably about 90–110 percent of the stoichiometric amount will be used.

Sodium carbonate in dry or aqueous form can be used in the process of this invention. However, the use of dry sodium carbonate often is preferred because it can provide for more controlled growth of the precipitate particles.

The pH in step (b) generally will be about 4–8.5; more preferably about 5–7; and most preferably about 6–7. Typically, adjusting the amounts of $Na_2CO_3$ addition can control the pH in the desired range.

The considerations for selecting the residence time and agitation for step (b) are similar to those disclosed for step (a).

In addition, if desired, one or more additional agitated vessels can be used in conjunction with step (b) to provide for additional residence time, reaction, precipitation, and/or particle growth. The configuration for a suitable additional agitated vessel is shown in FIG. 1 by item 22.

Step (c):

Step (c) of the process of this invention involves recovering, from a portion of the product of step (b) that is not recycled, metal carbonates, metal hydroxides, and sodium salts.

While any suitable method can be used for this step of the process of this invention, preferably the following will be used:

(i) separating the precipitates from a portion of the product of step (b) that is not recycled;

(ii) treating the aqueous media remaining after step (i) with an effective amount of a basic material selected from the group consisting essentially of sodium hydroxide, calcium hydroxide, calcium oxide, and mixtures thereof, and optionally calcium chloride, to produce at least some precipitates selected from the group consisting essentially of $CaCO_3$, metal hydroxides, and mixtures thereof, (iii) separating the precipitates from step (ii) and recycling them to step (a), step (b), step (c), the agitated tank of claim 5, step (i) or combinations thereof; and (iv) isolating the sodium salt from the liquid remaining after step (iii).

Any suitable method can be used for separating the precipitates. Examples include, but are not limited to, centrifuging, filtering, settling, decanting or combinations thereof.

For isolating the soluble metal salts, such as NaCl, from the liquid remaining after step (iii), any suitable method can be used, including, but not limited to evaporating or boiling away the liquid.

It should be noted that to aid the separation of precipitates, suitable flocculants can be used. Examples of suitable flocculants include polyacrylamides, polyacrylates, and copolymers thereof. Other suitable flocculants include tannins, starches, lignins, seaweed derivatives, and agar-agar. Preferred are anionic flocculants.

FIG. 1:

FIG. 1 sets forth an embodiment of this invention.

With reference to FIG. 1, a stream 1 of an acidic aqueous mixture of HCl and metal chlorides enters primary reactor 2, where step (a) of the process of this invention takes place.

The product from primary reactor 2 is fed to secondary reactor 4, via stream 3, where step (b) of the process of this invention takes place. Sodium carbonate 5 is fed to secondary reactor 4, and a portion of the product 6 from secondary reactor 4 is recycled to primary reactor 2. The remaining portion 7 of the product from secondary reactor 4 is fed to primary separator 8, where metal precipitates 9 are removed, and the remaining liquid 10 is fed to tertiary reactor 11.

Calcium chloride 12 and sodium hydroxide 13 are fed to tertiary reactor 11. The product 14 of tertiary reactor 11 is fed to secondary separator 15. A stream of precipitates 16 is removed from secondary separator 15 and recycled back to primary reactor 2. The remaining liquid 17 from secondary separator 15 is sent to crystallizer 18 where sodium chloride 19 is recovered, and water 21 is removed.

If desired, an agitated tank 22 can be used to provide for additional residence time, reaction, precipitation, and particle growth. If agitated tank 22 is used, then the stream of precipitates 16 can be routed to agitated tank 22, as shown by dashed line 23, and the precipitates from agitated tank 22 can be removed by stream 24.

EXAMPLES

The following examples illustrate the operation of the process of this invention. Unless otherwise indicated, all parts and percentages are by weight.

It should be noted that while considerations for selecting process parameters are set forth above, the apparatus used in the examples can be used for optimizing them. Some of these parameters include, but are not limited to, feed rate of the aqueous media, means for enhancing the removal of $CO_2$, feed rate of $Na_2CO_3$, amount of recycle, desirability of use of one or more agitated tanks, etc.

Example 1

Figure 2:
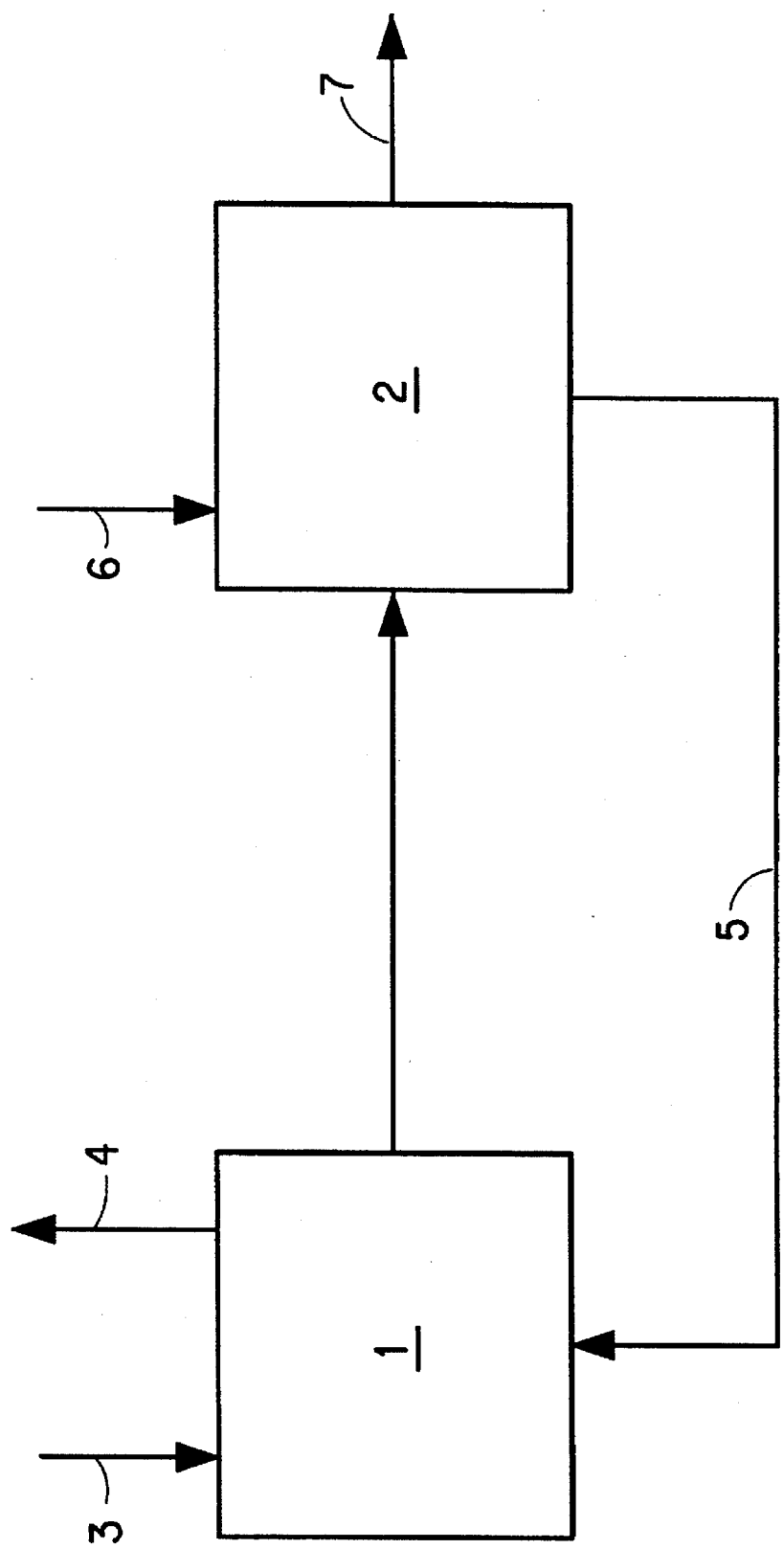
FIG. 2 sets forth a reaction system used for examples 1 and 2.

Experimentation was carried out in the reactor system set-forth in FIG. 2. In FIG. 2, item 1 is the primary reactor, and item 2 is the secondary reactor. Both reactors have a volume of 1.5 liters and have 4 internal baffles. During the reaction, the reactors were stirred at 220 revolutions per minute, and the temperature was maintained at about 40 degrees C.

Aqueous media containing metal chlorides and HCl was continuously fed into primary reactor 1 at a rate of 25 milliliters per minute. The pH of the aqueous media was less than 0, and it had a density of 1.05 grams per mililiter. The composition of the aqueous media was as follows: 2 percent iron, 0.2 percent titanium, 0.2 percent manganese, and 2 percent HCl. The other metal chlorides were present in an amount of about 0.5 percent and were predominantly composed of magnesium and aluminum.

Stream 5 is withdrawn from secondary reactor 2 and recycled to primary reactor 1 at a rate of about 32 mililiters per minute. This rate was varied to control the pH in the primary reactor 1 at about 3–4. $CO_2$ was evolved from the primary reactor at a rate of about 4.5 milliliters per second. At least some metal carbonates in stream 5 are dissolved in primary reactor 1 as evidenced by the size of the particulates in such stream decreasing after being fed to reactor 1, and the amount of soluble iron in reactor 1 increasing. At least some metal ions having a valence of at least +3 are converted to metal hydroxide precipitates as evidenced by a decrease in the concentration of soluble +3 and higher valence metals.

Overflow from the primary reactor 1 was fed to the secondary reactor 2 at a rate of about 59 milliliters per minute. Dry $Na_2CO_3$ was fed to the secondary reactor 2 at a rate of about 3 grams per minute. The feed rate of the $Na_2CO_3$ was varied to maintain a pH in the secondary reactor of about 6–7.

The production rate of the product 7 was about 26 mililiters per minute. The product contained about 2.5 percent precipitates, which were predominately iron carbonate and metal hydroxides. The liquid portion of the product contained about 8.6 percent NaCl, and had a purity of about 97.4 percent prior to brine treatment.

Example 2

Additional experimentation was carried out in the reactor system set-forth in FIG. 2. During the reaction, the reactors were stirred at 440 revolutions per minute, and the temperature was maintained at about 80 degrees C.

Aqueous media containing metal chlorides and HCl was continuously fed via line 3 into primary reactor 1 at a rate of 25 milliliters per minute. The pH of the aqueous media was less than 0, and it had a density of 1.19 grams per milliliter. The compositon of the aqueous media was as follows: 6 percent iron, 0.6 percent titanium, 0.7 percent manganese, and 2 percent HCl. The other metal chlorides were present in an amount of about 1.6 percent and were predominantly composed of magnesium and aluminum.

Stream 5 was withdrawn from secondary reactor 2 and recycled to primary reactor 1 at a rate of about 34 mililiters per minute. This rate was varied to control the pH in the primary reactor 1 at about 3–4. $CO_2$ was evolved from the primary reactor via line 4 at a rate of about 6.4 milliliters per second. At least some metal carbonates in stream 5 are dissolved in primary reactor 1 as evidenced by the size of the particulates in such stream decreasing after being fed to reactor 1, and the amount of soluble iron in reactor 1 increasing. At least some metal ions having a valence of at least +3 are converted to metal hydroxide precipitates as evidenced by a decrease in the concentration of soluble +3 and higher valence metals.

Overflow from the primary reactor 1 was fed to the secondary reactor 2 at a rate of about 60 milliliters per minute. Dry $Na_2CO_3$ was fed to the secondary reactor 2 via line 6 at a rate of about 7.6 grams per minute. The feed rate of the $Na_2CO_3$ was varied to maintain a pH in the secondary reactor of about 6–7.

The production rate of the product 7 was about 27 mililiters per minute. The product contained about 6 percent precipitates, which were predominately iron carbonate and metal hydroxides. The liquid portion of the product contained about 23 percent NaCl, and had a purity of about 98.7 percent prior to brine treatment.

The invention claimed is:

1. Process for treating aqueous media containing ions of metal chlorides, the metal ions thereof having valences of +2 and higher, and optionally acid comprising:

(a) contacting the aqueous media, at a pH of about 1–5, with an effective amount of product recycled from step (b) to dissolve at least some metal carbonates, produce at least some $CO_2$, convert at least some metal ions having a valence of at least +3 to metal hydroxide precipitates, and neutralize some acid, if present;

(b) contacting the product of step (a), at a pH of about 4–8.5, with an effective amount of dry $Na_2 CO_3$ to convert at least some metal ions of +2 valence to metal carbonate precipitates and form at least some dissolved sodium salts;

(c) recovering, from a portion of the product from step (b) that is not recycled, metal carbonates, metal hydroxides, and sodium salts, said process excluding reducing the valence state of the metal ions in the aqueous media prior to treating.

2. The process of claim 1 wherein the aqueous media being treated contains HCl and NaCl is one of the metal salts recovered.

3. The process of claim 1 wherein the pH in step (a) is about 3–4, and the pH in step (b) is about 5–8.

4. The process of claim 1 wherein the product from step (b) is fed to an agitated tank to provide for additional residence time, reaction, precipitation, and particle growth; a portion of the product from the agitated tank is recycled to step (a); and a portion of the product from the agitated tank is fed to step (c).

5. The process of claim 1 wherein a portion of the product from step (b) is recycled to step (a) without increasing the concentration of the precipitates.

6. The process of claim 1 wherein the residence time in each of steps (a) and (b) is about 1 minute to 12 hours.

7. The process of claim 1 wherein means are employed to enhance the removal of $CO_2$ evolved from step (a).

8. The process of claim 1 wherein:

(i) the aqueous media containing metal ions, HCl or mixtures thereof arising as a byproduct from the production of $TiO_2$ by the chloride process;

(ii) the pH in step (a) is about 3–4, and the pH in step (b) is about 5– 8; and (iii) the $Na_2CO_3$ introduced into step (b) is in dry form.

9. The process of any one of claims 1–8 wherein step (c) comprises:

(i) separating the precipitates from a portion of the product of step (b) that is not recycled;

(ii) treating the aqueous media remaining after step (i) with an effective amount of a basic material selected from the group consisting of sodium hydroxide, calcium hydroxide, calcium oxide, calcium chloride, and mixtures thereof, to produce at least some sodium salt, and at least some precipitates selected from the group consisting of $CaCO_3$, metal hydroxides, and mixtures thereof, (iii) separating the precipitates from step (ii) and recycling them to step (a), step (b), step (c), the agitated tank of claim 5, step (i) or combinations thereof; and (iv) isolating the sodium salt from the liquid remaining after step (iii).

10. The process of claim 1 wherein flocculant is used in step (c).

11. The process of claim 1 wherein step (a) and step (b) utilize a continuously stirred tank reactor.

* * * * *